(12) United States Patent
Zhou et al.

(10) Patent No.: US 8,154,715 B2
(45) Date of Patent: Apr. 10, 2012

(54) METHOD FOR MONITORING AND MEASURING OPTICAL PROPERTIES OF DEVICE IN POLARIZATION MAINTAINING FIBERS BY USING REFERENCE FIBER BRAGG GRATING AND FIBER COMPONENTS MANUFACTURED THEREBY

(75) Inventors: Changzun Zhou, Laval (CA); Yunfei Zhao, Saint-Laurent (CA)

(73) Assignee: ITF Laboratories Inc. (CA)

( * ) Notice: Subject to any disclaimer, the term of this patent is extended or adjusted under 35 U.S.C. 154(b) by 661 days.

(21) Appl. No.: 12/301,876

(22) PCT Filed: May 23, 2007

(86) PCT No.: PCT/CA2007/000904
§ 371 (c)(1),
(2), (4) Date: Nov. 21, 2008

(87) PCT Pub. No.: WO2007/134453
PCT Pub. Date: Nov. 29, 2007

(65) Prior Publication Data
US 2010/0225914 A1    Sep. 9, 2010

(30) Foreign Application Priority Data

May 23, 2006  (CA) .................................... 2548022

(51) Int. Cl.
*G01N 21/00* (2006.01)
*G01J 4/00* (2006.01)
(52) U.S. Cl. ........ 356/73.1; 356/364; 356/365; 356/370
(58) Field of Classification Search .................. None
See application file for complete search history.

(56) References Cited

U.S. PATENT DOCUMENTS

| | | | |
|---|---|---|---|
| 6,788,418 B1 * | 9/2004 | Kringlebotn | 356/477 |
| 6,816,260 B2 | 11/2004 | Peupelmann et al. | |
| 6,856,398 B2 * | 2/2005 | Ruchet | 356/453 |
| 6,856,401 B1 | 2/2005 | Ronnekleiv | |
| 2007/0089462 A1 * | 4/2007 | Farroni et al. | 65/385 |

OTHER PUBLICATIONS

Wuilpart et al. "Polarization Properties of Uniform Fiber Bragg Gratings Written in Highly Birefringent Fibers" Optics Communications vol. 247, Issues 4-6, Mar. 15, 2005.

(Continued)

*Primary Examiner* — Tarifur Chowdhury
*Assistant Examiner* — Gordon Stock, Jr.
(74) *Attorney, Agent, or Firm* — Brouillette & Partners; Robert Brouillette; Francois Cartier

(57) ABSTRACT

A method for measuring and monitoring the state of polarization (SOP) of a polarization maintaining (PM) fiber using a narrowband fiber Bragg grating (FBG) written on the same is provided. The PM fiber comprises a first narrowband reference FBG which is used as a reference to measure and monitor the SOP of the PM fiber. Due to the birefringence properties of the PM fiber, the reference FBG typically reflects two narrowband spectra, each having a central wavelength; one in the slow axis and one in the fast axis. By measuring the intensity of the reflected spectra in each axis and by tuning the fiber with a polarization controller, it is possible to adjust the fiber to a predetermined SOP. Accurate measures of optical properties (e.g. reflectivity) of optical devices (e.g. a FBG grating), according to the predetermined SOP, are possible.

12 Claims, 2 Drawing Sheets

OTHER PUBLICATIONS

Lee et al. "Adjustable Compensation of Polarization Mode Dispersion Using a High-Birefringence Nonlinearly Chirped Fiber Bragg Grating" IEEE Photonics Technology Letters vol. 11, No. 10, Oct. 1999.

Caucheteur et al. "Wavelength Dependency of Degree of Polarization for Uniform Bragg Gratings Written inot Polarization Maintaining Optical Fibers" Optics Communications vol. 247, Issues 4-6, pp. 325-333, Mar. 15, 2005.

* cited by examiner

METHOD FOR MONITORING AND MEASURING OPTICAL PROPERTIES OF DEVICE IN POLARIZATION MAINTAINING FIBERS BY USING REFERENCE FIBER BRAGG GRATING AND FIBER COMPONENTS MANUFACTURED THEREBY

CROSS-REFERENCE TO RELATED APPLICATIONS

The present patent application claims the benefits of priority of commonly assigned Canadian Patent Application No. 2,548,022, filed at the Canadian Intellectual Property Office on May 23, 2006.

FIELD OF THE INVENTION

The present invention generally relates to a method for measuring optical properties of optical fibers and optical devices. More particularly, the present invention generally relates to measurements of fiber Bragg gratings in polarization maintaining optical fiber.

BACKGROUND OF THE INVENTION

Fiber Bragg gratings (hereinafter "FBG") have been widely used in optical telecommunication systems, fiber lasers, as well as in the sensing industry. Wavelength stabilizer of pump laser and optical filters are only examples of the well-known applications of FBG in optical telecommunication.

FBGs can generally be written on any type of optical fibers, be it single mode, multi-mode, polarization maintaining (hereinafter "PM") and so on. In a nutshell, PM fibers have the particularity that they will maintain the polarization of the transmitted light beam along all the length of the fiber. However, FBGs of PM fiber have an added complexity compared to FBGs written on standard single mode fiber in term of manufacturing and measurements, especially the latter. This added complexity comes from the birefringence properties of the PM fiber, meaning that the refractive index of the PM fiber is slightly greater in its slow axis than in its fast axis. Therefore, the optical properties of a FBG written on a PM fiber will vary depending on whether the light is coupled in the slow axis, the fast axis or in a combination thereof. Hence, depending on the measurement conditions (e.g. the coupling of the light), the measured properties will vary. For example, the center wavelength reflected by a FBG of a PM fiber measured in the slow axis will be greater than the center wavelength reflected in the fast axis.

Therefore, when it is necessary to measure the optical properties of a FBG, or of another optical device, using a PM fiber, it is necessary to measure the state of polarization (hereinafter "SOP"). In other words, the light power ratio between the fast axis and the slow axis must be determined and monitored during optical measurements of FBG (and other optical devices) written on a PM fiber.

In a perfect situation, the ideal test set-up for this purpose would be to have an all-PM configuration. Indeed, the perfect set-up would comprises devices and/or components that are all polarization maintaining such as a PM light source, a PM coupler, a PM circulator and so on. However, for an all-PM set-up, the problem is not only unreasonable cost, it is also availability. Indeed, in some cases, some of the aforementioned elements simply do not exist.

There are, in the prior art, methods to measure optical properties of optical devices or components using reference FBG. In fact, the term "reference fiber Bragg grating" was first introduced by Martin in his article entitled "Use of a Sampled Bragg Grating as an In-Fiber Optical Resonator for the Realization of a Referencing Optical Frequency Scale for WDM Communications" (OFC' 1997 Technical Digest, pp. 284-285). However, Martin's publications, related to "reference fiber Bragg grating", define its application as an in-fiber optical wavelength/frequency reference only.

In 1998, Miller et al. (U.S. Pat. No. 5,838,437) proposed a fixed fiber Fabry-Perot (FFP) filter used in combination with a reference FBG as wavelength and frequency reference.

In 2000, Davis et al. (U.S. Pat. Nos. 6,118,914 and 6,403,949) disclosed the use of a temperature stabilized FBG as a wavelength reference.

In 2003, Valente et al. (U.S. Pat. No. 6,658,171) proposed a technology called "Optical Fiber Bragg Grating Polarizer". In their invention, the FBG was used as a component to polarize a light wave.

Finally, in 2004, Peupelmann et al. (U.S. Pat. No. 6,816,260) proposed a device referred to as a fiber polarimeter which utilized oblique FBG to couple out of a light wave, the coupling result depending on the SOP. Therefore, the portions of the coupled light could be used to determine the four Stokes parameters. However, in Peupelmann's invention, the FBG was used as a tool to couple out a portion of a light wave not as a reference. Furthermore, their invention is not based on FBG of PM fiber.

The problem with all these references and methods is that they do not provide a simple yet effective method to accurately measure the optical properties of a FBG in a PM fiber according to a predetermined SOP. There is therefore a need for such a new method.

OBJECTS OF THE INVENTION

Accordingly, a first object of the present invention is to provide a method to accurately measure the SOP of a PM fiber.

Another object of the present invention is to provide a method which uses a reference FBG to measure and monitor the SOP of a PM fiber.

Still another object of the present invention is to provide a method which allows to adjust the SOP of a PM fiber.

Yet another object of the present invention is to provide a method to accurately measure the optical properties of a FBG written on a PM fiber.

Other and further objects and advantages of the present invention will be obvious upon an understanding of the illustrative embodiments about to be described or will be indicated in the appended claims, and various advantages not referred to herein will occur to one skilled in the art upon employment of the invention in practice.

SUMMARY OF THE INVENTION

According to the present invention, in order to determine and monitor the SOP of a PM fiber, a PM fiber is provided with a reference FBG which can provide a SOP reference for the PM fiber.

It is understood that the state of polarization (SOP) generally depends on a plurality of parameters. However, for the sake of simplicity, as used hereinabove and hereinafter, the concept of SOP shall refers only to the light power distribution between the slow axis and the fast axis of a polarization maintaining fiber.

More precisely, the reference FBG, which is a narrowband FBG, allows the measurement of the power ratio between the slow axis and the fast axis. As can be seen in FIG. 1, a narrowband reference FBG in a PM fiber will presents two peaks when illuminated with a beam of light which is not coupled purely in either the slow axis or the fast axis. The power intensity of these two peaks indicates the polarization orientation with respect to both axes. Thus, by measuring the power intensity of these two peaks, it is possible to measure the SOP.

By adjusting the orientation of the PM fiber and by continuously monitoring the SOP of the reference FBG, the method of the present invention allows to adjust the PM fiber to any predetermined SOP.

Moreover, if another FBG is formed or written on the PM fiber, the reference FBG of the PM fiber will provide a reference of the SOP for the FBG to be measured. The optical spectrum of the FBG to be determined can be measured in any defined SOP by adjusting the polarization orientation to the required conditions if necessary.

Depending on the requirement and/or the availability of the equipments, the reference FBG can perform monitoring functions of the optical SOP in either the transmission spectrum or in the reflection spectrum.

Usually, with a broadband FBG, for example a FBG having a bandwidth larger than 0.5 nm, the peaks of the fast axis and the slow axis reflections will overlap, resulting in difficulty in determining accurately the current SOP under which the FBG is being measured. However, if a narrowband reference FBG is introduced in the same fiber loop as the FBG to be measured, this narrowband reference FBG will accurately and independently indicate the SOP of the fiber. Or course, there should be an adequate wavelength difference between the reference FBG and the FBG to be measured to avoid undesirable overlap. Furthermore, if the optical fiber loop is so configured that adjustability of the fiber SOP is possible, any pre-defined SOP can be achieved for the FBG under measurement.

It has also been found that the set-up of the present invention used to determine the optical properties of a FBG according to a particular SOP can also be used to accurately measure the optical reflectivity of the FBG under examination. Therefore, the present invention also allows for the optical reflectivity measurement of a FBG or other optical component, device and subsystem, by using a reference FBG.

The reference FBG, having its reflectivity being pre-determined by known reflection or transmission spectrum measuring methods, provides an absolute optical power intensity reference. Once the reference reflectivity is determined, the reflectivity of the other FBG or devices/subsystems can be determined based on their power intensity difference with respect to the peak intensity value of the reflectivity of the reference FBG.

This method is applicable to ultra-low reflectivity measurements that are near to or beyond the limits of transmission spectrum measurement instruments. This method is also applicable to reflectivity measurement of FBGs in non-single mode fibers in which accurate reflectivity measurements in transmission configuration are difficult due to optical interference between modes.

Furthermore, as long as the reflected spectra do not overlap, the reference FBG method of the present invention can be applied to SOP measurements and/or to reflectivity measurements of more than one FBGs. Moreover, the reference FBG method of the present invention can use a single reference FBG or a plurality of reference FBGs depending on the applications. Also, the method can be used to measure SOP and reflectivity of optical devices and systems other than FBGs. Understandably, if applicable, the reference FBGs could be formed or written in optical waveguides other than optical fibers.

Moreover, by providing a reflectivity reference FBG and a SOP reference FBG, which can be unitary or distinct, it is possible to combine the SOP related measurement method and system and the reflectivity measurement method and system into a single application.

The features of the present invention which are believed to be novel are set forth with particularity in the appended claims.

BRIEF DESCRIPTION OF THE DRAWINGS

The present invention shall become better understood by reference to the following detailed description and considered in connection with the accompanying drawings wherein.

DETAILED DESCRIPTION OF THE PREFERRED EMBODIMENT

Figure 2:
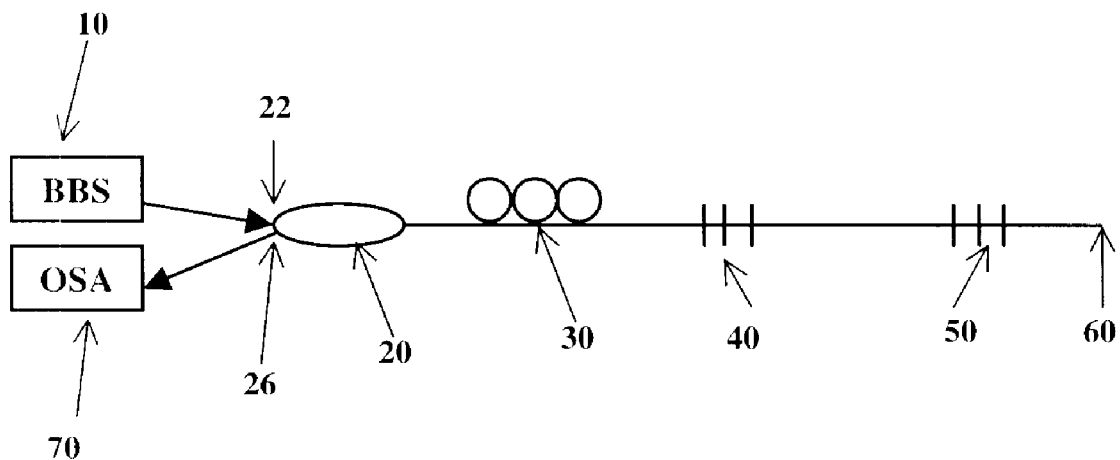
FIG. 2 is a schematic representation of one embodiment of a set-up to measure the optical properties of a FBG by using reference FBG.

Referring first to FIG. 2, we can see a block diagram of a set-up according to a preferred embodiment of the method of the present invention. The set-up generally comprises a broadband light source (BBS) 10, a circulator 20, a polarization controller 30 in the case of the measurement of the optical properties of FBG written of a PM fiber, at least one reference FBG 40, at least one FBG to be measured 50 and an optical spectrum analyzer 70 (hereinafter "OSA").

It is to be understood that this particular setting is a preferred embodiment. Therefore, it is possible to substitute some components of the set-up by other equipments providing the same function. For example, the broadband light source 10 could be replaced by a tuneable laser sweeping across a broad spectrum.

The light output from the broadband laser source 10 is optically coupled to the input 22 of the circulator 20, the output of circulator 20 is connected to the polarization controller 30 input. The output port of the controller 30 is itself connected to the PM fiber which comprises: a first reference FBG 40, a FBG to measured 50 and a fiber tip 60 preferably sealed with optical index matching gel to avoid Fresnel reflections. The return port 26 of the circulator 20 is connected to the OSA 70 for measuring the reflection spectrum. Understandably, the reference FBG 40 and the FBG to be measured 50 could be provided on two different fibers which are spliced together prior to the measurements.

Figure 1:
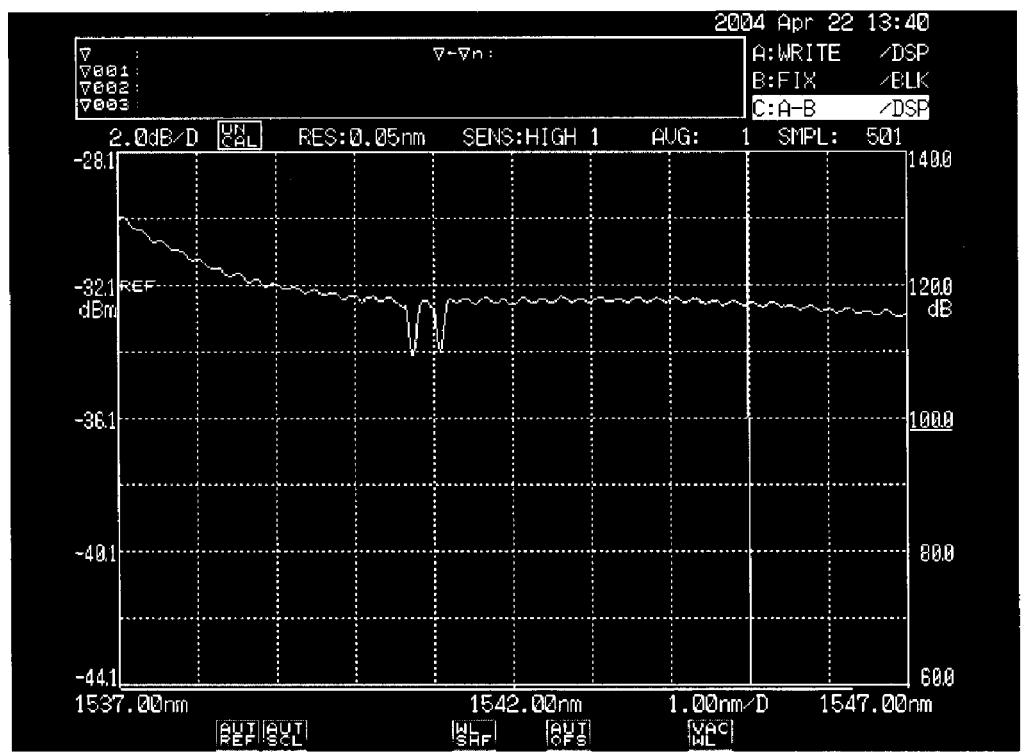
FIG. 1 is a picture of a transmission spectrum of a reference FBG written on a PM fiber.

The narrowband reference FBG 40 of the present invention is generally written by using UV photons. The current SOP of the PM fiber is then determined by measuring the reflectivity of the reference FBG 40 in the reflection or in the transmission spectrum. An example of such measurement in the transmission spectrum is shown in FIG. 1. As can be seen in FIG. 1, the transmission spectrum shows two distinct peaks. The center wavelength of the leftmost peak is the wavelength reflected by the reference FBG in the fast axis whereas the center wavelength of the rightmost peak is the wavelength reflected by the reference FBG in the slow axis.

By measuring the actual intensity of each peaks, it is possible to determine the actual SOP of the PM fiber. Therefore, by adjusting the PM fiber with the polarization controller 30 and by continuously monitoring the SOP of the reference FBG, it is possible to adjust the PM to a predetermined SOP. Ultimately and if necessary, it is possible to fully couple the light into either the slow axis only or into the fast axis only. This full coupling would generally be detected by the presence of a single large peak.

However, the skilled addressee will understand that the use of a narrowband reference FBG is necessary in order to distinguish between the slow axis peak and the fast axis peak.

Once the SOP of the PM fiber is determined and, if necessary, adjusted, the next step is to measure the optical properties of the FBG or FBGs to be measured in either the transmission spectrum or in the reflection spectrum, according to requirements of the test and/or the availability of the equipments. However, since the SOP has been already predetermined, the optical properties measured in this step will reflect this predetermined SOP.

Understandably, the FBG to be measured could be already written on the PM fiber or could be written after the SOP of the PM fiber has been measured and/or adjusted with the reference FBG.

The method previously described can be advantageously used to provide an efficient way to manufacture FBGs with predetermined optical properties with respect to certain SOP. Accordingly, a reference FBG would be written at preferably one extremity of a long PM optical fiber, for example, having a length of 100 meters. The SOP would then be adjusted via the polarization controller 30. After obtaining a particular SOP, a first FBG would be written at preferably the other extremity of the fiber. After measuring and/or adjusting the optical property or properties of the first FBG and verifying that this or these optical properties are adequate, the portion of fiber which supports the first FBG would be cut using known method. Then, a second FBG would be written at the extremity of the now slightly shorter fiber. Then again, after measuring and/or adjusting the optical property or properties of the second FBG and verifying that this or these optical properties are adequate, the portion of fiber which supports the second FBG would be cut. This process could go on until all the available fiber has been cut. Understandably, the SOP could be readjusted or changed for each new FBGs.

Another advantage of the method of the present invention is that it can be adapted to accurately measure the reflectivity of a FBG by comparing the intensity of the reflected wavelength, or spectrum, to a reference intensity provided by a reference FBG. Indeed, when the reference FBG is written into the fiber, it is possible to adjust its reflectivity, with respect to a given axis in the case of a PM fiber, to a predetermined and preferably easy to measure value.

Figure 3:
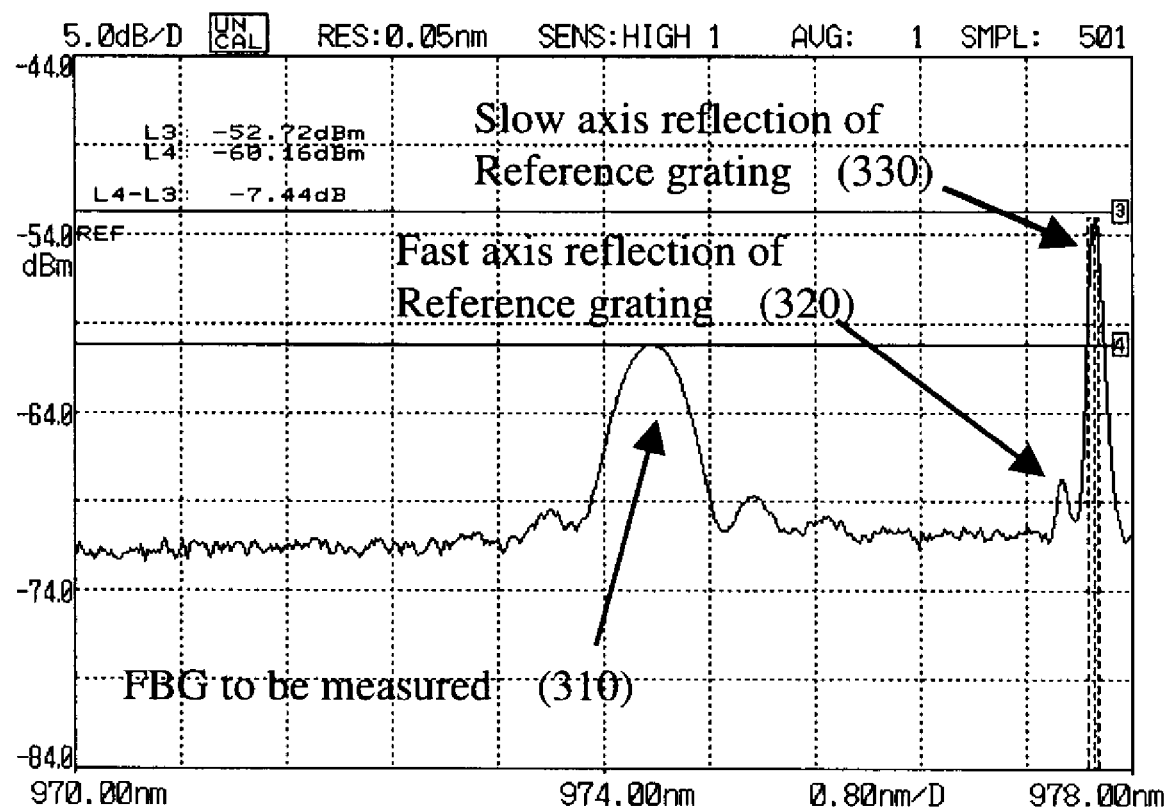
FIG. 3 is a picture of a reflectivity spectrum of a reference FBG and a FBG to be measured.

FIG. 3 shows an example of a FBG reflectivity measurement in reflection spectrum with the reference FBG. In FIG. 3, there are three spectrums. From left to right, there are the reflected spectrum of the FBG under measurement 310, the reflected spectrum of the reference FBG in the fast axis 320 and the reflected spectrum of the reference FBG in the slow axis 330.

According to the previously described method, it is possible to measure the reflectivity of the FBG under measurement according to any SOP simply by adjusting the SOP of the PM fiber, with the polarization controller 30 and by monitoring the SOP with the reference FBG. Understandably, in the case of a normal single mode or multi-mode fiber, there is no need for SOP adjustment.

When the PM fiber has been adjusted to a particular SOP, the reflectivity of the FBG to be measured can be compared to the reflectivity of the reference FBG. In the example of FIG. 3, the reflectivity of the reference FBG 330 is measured with a known method. This reference FBG is most preferably a narrow bandwidth FBG whose fast axis and slow axis reflection can be easily distinguished in the reflection spectrum. In FIG. 3, the reflection spectrum of the slow axis 330 is the rightmost spectrum whereas the reflection spectrum of the fast axis 320 is the small spectrum next to the rightmost slow axis spectrum 330.

As it is shown in FIG. 3, the fast axis reflection 320 has already been substantially suppressed or reduced by adjusting the fiber with the polarization controller 30 to achieve a maximum light coupling in the slow axis. In this way, it is ensured that the spectral measurement of the FBG under test is made in slow axis.

However, the FBG under test can be measured in any pre-defined SOP by controlling the light coupling using the polarization controller 30 while observing the relative intensities of the two peaks of the reference FBG. The reference FBG therefore performs monitoring or indicating functions of the optical SOP not only in the reflection spectrum but also in the transmission spectrum if proper configurations are made.

After a suitable SOP is obtained for the underlying test or measurement, reflectivity measurement for the FBG under test can be executed precisely by measuring the difference between the reference FBG's reflection peak and the peak intensity of the FBG under test. Obviously, as long as the reflected spectrums do not overlap, the methods of reflectivity measurement and SOP referencing described above can be applied simultaneously to more than one FBGs and/or with more than one reference FBGs.

Moreover, even if the aforementioned reflectivity measurement method and system were described using PM fiber, it is to be understood that the method can be effected on regular single mode and multi-mode fibers without departing from the scope of the invention. However, since single mode and multi mode fibers generally do not display birefringence properties, there is no need to adjust the SOP of the fiber when single mode or multi-mode fibers are used. In those instance, the reference FBG only provides a reflectivity intensity reference.

Furthermore, as described above for the SOP measurement method, the reflectivity measurement method can be advantageously used to increase the efficiency of FBG manufacturing. Indeed, a reference FBG could be written preferably at one end of a long optical fiber, for example, having a length of 100 meters. The reflectivity would then be measured precisely to determine a reference reflectivity. Then, a first FBG would be written preferably at the other extremity of the fiber. After measuring and/or adjusting the reflectivity of the first FBG and verifying that the reflectivity is adequate, the portion of fiber which supports the first FBG would be cut using known method. Then, a second FBG would be written preferably at the extremity of the now slightly shorter fiber. Then again, after measuring and/or adjusting the reflectivity of the second FBG and verifying that the reflectivity is adequate, the portion of fiber which supports the second FBG would be cut. This process could go on until all the available fiber has been cut.

Although preferred embodiments of the invention have been described in detail herein and illustrated in the accompanying figures, it is to be understood that the invention is not limited to these precise embodiments and that various changes and modifications may be effected therein without departing from the scope or spirit of the present invention.

The invention claimed is:

1. A method for measuring and/or adjusting the state of polarization of a polarization maintaining optical fiber, said method comprising:
   providing said polarization maintaining fiber, said polarization maintaining fiber defining a slow axis and a fast axis, said fiber having an orientation;
   writing a narrowband reference fiber Bragg grating on said fiber, said reference fiber Bragg grating having a first reflection spectrum and a first transmission spectrum;
   sending a beam of light through said fiber;
   detecting said first transmission spectrum or said first reflection spectrum of said reference fiber Bragg grating;
   measuring a first intensity of a first peak in said first transmission spectrum or in said first reflection spectrum, said first peak being associated with said slow axis of said fiber;
   measuring a second intensity of a second peak in said first transmission spectrum or in said first reflection spectrum, said second peak being associated with said fast axis of said fiber;
   determining said state of polarization of said fiber by comparing said first intensity and said second intensity;
   writing a second fiber Bragg grating on said fiber, said second fiber Bragg grating having a second reflection spectrum and a second transmission spectrum, said second reflection spectrum being distinct from said first reflection spectrum and said second transmission spectrum being distinct from said first transmission spectrum;
   measuring at least one optical property of said second fiber Bragg grating in accordance with said state of polarization.

2. A method as claimed in claim 1, wherein said step of detecting said first transmission spectrum or said first reflection spectrum of said reference fiber Bragg grating is effected with an optical spectrum analyzer.

3. A method as claimed in claim 1, wherein said step of sending a beam of light through said fiber is effected with a broadband light source.

4. A method as claimed in claim 1, wherein said step of sending a beam of light through said fiber is effected with a tuneable laser.

5. A method as claimed in claim 1, wherein said narrowband reference fiber Bragg grating further defines a reference reflectivity.

6. A method as claimed in claim 1, said method further comprising the steps of:
   adjusting said orientation of said fiber to modify said state of polarization.

7. A method as claimed in claim 6, wherein said step of adjusting said orientation of said fiber is effected with a polarization controller.

8. A method for measuring and/or adjusting the state of polarization of a polarization maintaining optical fiber, said method comprising:
   providing said polarization maintaining fiber, said polarization maintaining fiber defining a slow axis and a fast axis, said fiber having an orientation;
   writing a narrowband reference fiber Bragg grating on said fiber, said reference fiber Bragg grating having a first reflection spectrum, a first transmission spectrum, and a reference reflectivity;
   sending a beam of light through said fiber;
   detecting said first transmission spectrum or said first reflection spectrum of said reference fiber Bragg grating;
   measuring a first intensity of a first peak in said first transmission spectrum or in said first reflection spectrum, said first peak being associated with said slow axis of said fiber;
   measuring a second intensity of a second peak in said first transmission spectrum or in said first reflection spectrum, said second peak being associated with said fast axis of said fiber;
   determining said state of polarization of said fiber by comparing said first intensity and said second intensity;
   adjusting said orientation of said fiber to either minimize said first intensity of said first peak in said first reflection spectrum or minimize said second intensity of said second peak in said first reflection spectrum;
   measuring said reference reflectivity;
   writing a second fiber Bragg grating on said fiber, said second fiber Bragg grating having a second reflection spectrum and a second transmission spectrum, said second reflection spectrum being distinct from said first reflection spectrum and said second transmission spectrum being distinct from said first transmission spectrum, said second fiber Bragg grating having a second reflectivity;
   measuring a difference between said reference reflectivity and said second reflectivity in said first and second reflection spectra;
   determining said second reflectivity by comparing said reference reflectivity and said difference between said reference reflectivity and said second reflectivity.

9. A method for measuring the reflectivity of a fiber Bragg grating written on an optical fiber, said method comprising:
   providing said optical fiber;
   writing a reference fiber Bragg grating on said fiber, said reference fiber Bragg grating defining a reference reflection spectrum and a reference transmission spectrum, said reference fiber Bragg grating having a reference reflectivity;
   sending a beam of light through said fiber;
   measuring the intensity of said reference reflectivity of said reference fiber Bragg grating in said reference reflection spectrum;
   writing a second fiber Bragg grating on said fiber, said second fiber Bragg grating defining a second reflection spectrum and a second transmission spectrum, said second fiber Bragg grating having a second reflectivity;
   measuring a difference between said reference reflectivity and said second reflectivity in said reference and second reflection spectra;
   determining said second reflectivity by comparing said reference reflectivity and said difference between said reference reflectivity and said second reflectivity.

10. A method to manufacture at least one portion of a polarization maintaining optical fiber comprising at least one fiber Bragg grating, said method comprising:
   a) providing said polarization maintaining fiber, said fiber having a first extremity and a second extremity, said polarization maintaining fiber defining a slow axis and a fast axis and said fiber having an orientation;
   b) writing a narrowband reference fiber Bragg grating on a first portion of said fiber located at said first extremity of said fiber, said reference fiber Bragg grating defining a reference reflection spectrum and a reference transmission spectrum;
   c) sending a beam of light through said fiber;

d) detecting said reference transmission spectrum or said reference reflection spectrum of said reference fiber Bragg grating;

e) measuring a first reference intensity of a first reference peak in said reference transmission spectrum or in said reference reflection spectrum, said first reference peak being associated with said slow axis of said fiber;

f) measuring a second reference intensity of a second reference peak in said reference transmission spectrum or in said reference reflection spectrum, said second reference peak being associated with said fast axis of said fiber;

g) determining a state of polarization of said fiber by comparing first reference intensity and said second reference intensity;

h) adjusting, if necessary, said state of polarization of said fiber by changing said orientation of said fiber;

i) writing a second fiber Bragg grating on a second portion of said fiber located at said second extremity of said fiber;

j) measuring at least one optical property of said second fiber Bragg grating;

k) cutting said second portion of said fiber.

11. A method as claimed in claim 10, said method further comprising the steps of:

l) writing a third fiber Bragg grating on a third portion of said fiber located at said second extremity of said fiber;

m) measuring at least one optical property of said third fiber Bragg grating;

n) cutting said third portion of said fiber.

12. A method as claimed in claim 11, wherein steps l), m) and n) are repeated until said fiber comprises only said first portion.

* * * * *